April 19, 1966     H. J. HEPP     3,247,177
SEPARATION OF HYDROCARBONS BY UREA ADDUCT FORMATION
Filed Aug. 6, 1962
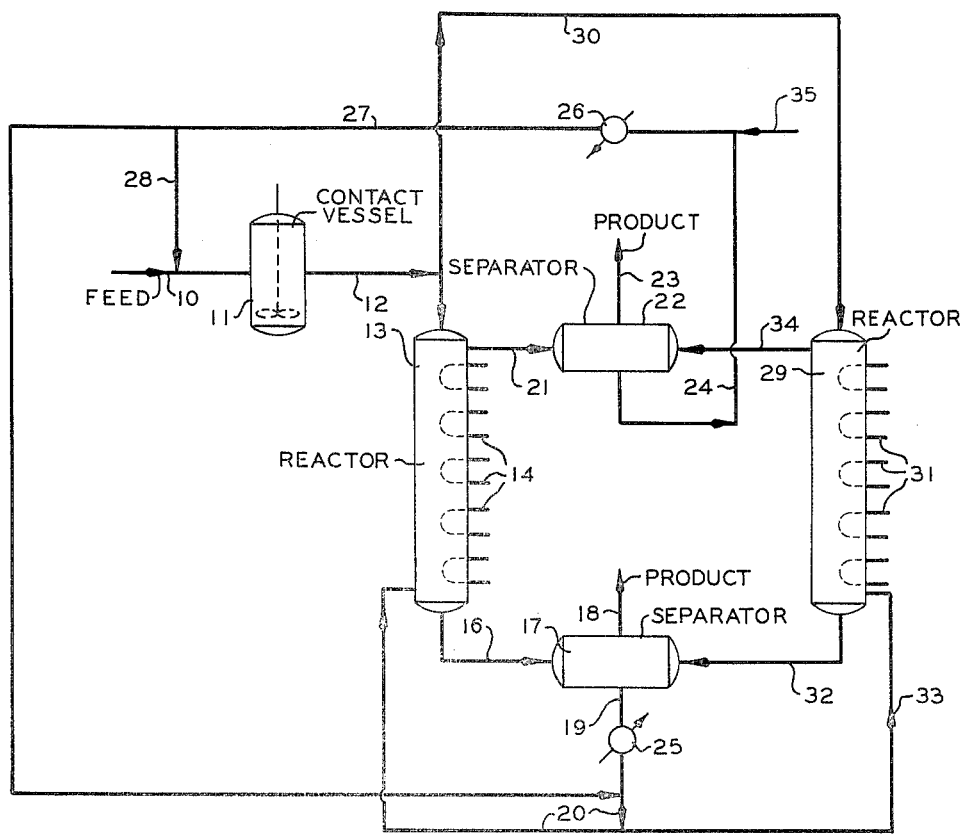
INVENTOR.
H. J. HEPP
BY *Young & Quigg*
ATTORNEYS United States Patent Office 3,247,177
Patented Apr. 19, 1966

3,247,177
SEPARATION OF HYDROCARBONS BY UREA
ADDUCT FORMATION
Harold J. Hepp, Bartlesville, Okla., assignor to Phillips
Petroleum Company, a corporation of Delaware
Filed Aug. 6, 1962, Ser. No. 215,167
8 Claims. (Cl. 260—96.5)

This invention relates to a separation process and apparatus therefor comprising the treatment of compounds which form adducts with urea or thiourea. In another aspect, this invention relates to a process for the separation of an adduct-forming compound from a non-adduct-forming compound by the selective reaction thereof with urea or thiourea. In another aspect, this invention relates to a process for the separation of an adduct-forming compound from a non-adduct-forming compound wherein there is utilized a bed of granular material containing a substantial volume of inter-granular void space.

It has been known to the prior art that urea or thiourea will react with certain adduct-forming compounds to form adducts. Thus, for example, it is known that urea will react with straight carbon atom chain hydrocarbons having at least 7 carbon atoms per molecule to form a crystalline adduct. It is also known that the thiourea will react to form crystalline adduct with branched-chain hydrocarbons but will not form adducts with straight-chain or aromatic hydrocarbons. The formed adduct is very voluminous, amounting to about 50 cubic feet per barrel of n-paraffin complexed in the $C_{10}$–$C_{18}$ range. Therefore, large filters, disadvantageous to an economic separation process, are required to separate the formed adduct from the remainder of the hydrocarbon feed.

With the employment of filters to separate the formed adduct from the hydrocarbon feed, considerable decomposition of the adduct may take place during washing of the filter cake. This can be attributed to the equilibrium that exists between the residual n-paraffin in the treated mixture and the complex wherein, for example, urea is employed to separate at least a portion of the n-paraffin from a hydrocarbon feed.

If urea is employed in a fixed bed to avoid filtering problems, formation of the adduct with attendant swell results in movement of the bed and the development of cracks. The development of cracks in the fixed bed leads to channeling an inefficient extraction in washing process steps.

I have by my invention provided a separation process wherein an adduct-forming compound is admixed with an aqueous solution of urea or thiourea at an elevated temperature and the mixture cooled forming adducts in the presence of a granular material containing a substantial volume of inter-granular and/or intra-granular void space.

Accordingly, an object of my invention is to provide an improved separation process.

Another object of my invention is to provide a process for the separation of an adduct-forming compound from a non-adduct-forming compound by means of selective reaction with urea or thiourea.

Other objects, advantages, and features of my invention will be readily apparent to those skilled in the art from the following description and the appended claims.

The invention is particularly applicable to the production of jet fuels having freeze points lower than are obtained in normal refining processes. As noted in Industrial and Engineering Chemistry, volume 45, page 112, January 1953, the freeze point of kerosene can be lowered from −41° F. to −62° F. by the formation of urea adducts and the subsequent removal of 8 percent of the kerosene feed.

The invention is applicable to the separation of n-paraffins of $C_7$ and higher molecular weight from a feed mixture containing said n-paraffins. Feed mixtures containing said n-paraffins, to which can be added a reaction promoter such as methylisobutyl ketone, and an emulsifying agent such as an alkylbenzene sulfonate, or a non-ionic detergent such as those made from ethylene oxide, is mixed with a volume of an aqueous urea solution at a relatively elevated temperature, preferably a saturated aqueous urea solution at a temperature in the range of 90–100° F. The quantity of aqueous urea solution employed is sufficient so that on cooling sufficient urea above the amount required to saturate the water at terminal reaction conditions will be released to complex with the desired quantity of n-paraffins to be separated from the feed mixture. For n-paraffins in the $C_{10}$–$C_{18}$ range, for example, the quantity of urea employed will range from about 850 to 900 pounds of urea per barrel of n-paraffin complexed.

By employing an aqueous urea solution that is initially less than saturated, the temperature of the hydrocarbon and aqueous urea solution mixture must be lowered below that otherwise required when an initially saturated aqueous urea solution is employed to form the urea adduct. Accordingly, a saturated aqueous urea solution is preferred but it is not intended that the invention should be limited thereto.

The drawing is a schematic representation of one embodiment of the invention.

Referring to the drawing, a feedstock containing n-paraffins of $C_7$ and higher molecular weight is passed via conduit means 10 in combination with a saturated aqueous urea solution (preferred embodiment), from a source hereinafter described, to a means for mixing the feed and urea solution such as a stirred contact vessel 11. It is within the scope of this invention to employ other means for mixing the urea solution and feedstock such as mixing pumps, opposed jets or other suitable mixing apparatus. The temperature within contact vessel 11 is maintained by preheating the feed by a means not herein illustrated and controlling the temperature of the saturated aqueous urea solution. As previously noted, the temperature is preferably maintained in the range of 90–100° F. The time of contact within contact vessel 11 should be sufficiently short so that adduct formation does not occur within contact vessel 11 to any appreciable extent.

The mixture of feed and urea solution is passed via conduit means 12 to a reactor 13. Reactor 13 contains a fixed bed of granular material such as charcoal, bauxite, silica gel, sand, gravel, quartz chips and the like of sufficiently large mesh that pressure drop through the fixed bed is relatively small, yet of small enough mesh size that a filtering action is obtained, with the fixed bed containing a substantial volume of inter-granular and/or intragranular void space. Preferably, the granular material will have a particle size ranging from 4 to 20 mesh. The fixed bed is provided with suitably spaced cooling coils 14 or other cooling means to provide a temperature gradient through the granular bed, the temperature decreasing from the inlet to the outlet. A single granular bed or multiple granular beds in series or parallel can be employed. Progessive cooling through the fixed bed, from the inlet to the outlet, is applied so that the aqueous phase is always saturated with urea as urea is withdrawn from the aqueous phase to form the complex. For the most efficient operation of the reactor, flow rate is adjusted to deposit adduct uniformly throughout the bed, thereby making full use of the granular voids in the reactor. Preferably, no more than 40 to 60 volume percent of the extractable paraffins should be removed in reactor 13. If more complete removal is desired, one or more additional granular beds should be provided. This insures that the adduct will be formed uniformly throughout the fixed granular bed.

The voluminous adduct is trapped in the void spaces of the granular packing and retained within reactor 13. Sufficient feed mixture is passed to reactor 13 via conduit means 12 so that the voids in the granular bed are substantially filled, but insufficient to create a substantial pressure drop through the granular bed, or to cause lifting or movement of the granular bed. At this point the feed to reactor 13 is interrupted, and liquid product drained or blown by gas pressure (from a source not herein illustrated) from the reactor 13.

During the adduct-forming period and draining of reactor 13, a liquid mixture comprising saturated aqueous urea solution and the remainder of the liquid feed is withdrawn from reactor 13 via conduit means 16 and passed to a means for separating the saturated aqueous urea solution from the remaining portion of the liquid feed. With the feed to contact vessel 11 comprising a hydrocarbon mixture, a means for separating the saturated aqueous solution can comprise a liquid phase separator 17.

A liquid product having a reduced n-paraffin concentration is withdrawn from separator 17 via conduit means 18. A saturated aqueous urea solution is withdrawn from separator 17 via conduit means 19.

It is within the scope of this invention to recover more or less pure n-paraffins from reactor 13 by passing a suitable non-reactive wash liquid such as an isoparaffin, or a low-boiling hydrocarbon fraction, to reactor 13 after draining it to free the complex contained therein from liquid contaminants. The wash liquid containing the liquid contaminants can then be passed to a conventional separation system (not shown) for the recovery and separation of the wash liquid.

In order to decompose the complex formed within reactor 13, the saturated urea solution withdrawn from separator 17 is heated to a temperature in the range of 120 to 150° F. and passed to reactor 13 via conduit means 20. The cooling of the fixed granular bed by cooling coils 14 is discontinued. The complex within reactor 13 is decomposed and the hydrocarbon released. The urea is dissolved in the aqueous solution. The aqueous and hydrocarbon mixture is withdrawn from reactor 13 via conduit means 21 and passed to a conventional liquid phase separator 22.

Within separator 22, the n-paraffin liquid hydrocarbon is separated from the aqueous urea solution and withdrawn from separator 22 via conduit means 23. The aqueous urea solution is withdrawn from separator 22 via conduit means 24. This relatively hot saturated aqueous urea solution is cooled via heat exchange means 26 and recycled via conduit means 27, conduit means 28, and conduit means 10 to contact vessel 11. The aqueous urea solution is cooled by means of heat exchange means 26 to the temperature required to maintain the desired mixing temperature of the saturated aqueous urea solution and feed mixture in contact vessel 11.

The aqueous urea solution withdrawn from separator 22 can also be recycled to reactor 13 to cool the granular bed after the step of decomposing and removing the complex from reactor 13 is complete. The aqueous urea solution is recycled from separator 22 via conduit means 24, heat exchange means 26, conduit means 27, and conduit means 20 to reactor 13. Additional saturated aqueous urea solution as required is passed to the process via conduit means 35 to conduit means 24.

With the voids in reactor 13 substantially filled with complex, the feed to reactor 13 from contact vessel 11 is discontinued and the saturated aqueous urea solution and feed mixture passed from contact vessel 11 to reactor 29 via conduit means 12 and conduit means 30. Reactor 29 can be identical in structure to reactor 13, containing a fixed granular bed as described in connection with reactor 13 and having a means 31 for progressively cooling the fixed granular bed. By employing two reactors in parallel, it becomes possible to provide a continuous separation process. While the complex within reactor 13 is being decomposed, a complex is being formed within reactor 29, and while the complex is being formed within reactor 13, the complex is being decomposed in reactor 29.

A liquid mixture containing substantially less n-paraffins is withdrawn from reactor 29 via conduit means 32 and passed to separator 17. Within separator 17 the liquid mixture is separated in the same manner as described in connection with the separation of the liquid mixture withdrawn from reactor 13.

The voids within the fixed granular bed of reactor 29 having been substantially filled, a saturated aqueous urea solution is withdrawn from separator 17 via conduit means 19, heated via heat exchange means 25, and passed via conduit means 20 and conduit means 33 to reactor 29. The complex within reactor 29 is decomposed and the hydrocarbon released. The urea within reactor 29 is dissolved in the aqueous solution and the hydrocarbon and saturated aqueous urea solution withdrawn from reactor 29 via conduit means 34 and passed to separator 22.

The sizing of separators 17 and 22 and the valving of the lines to permit alternate use of reactors 13 and 29 will be obvious to those skilled in the art.

Although the inventive process has been described as applied to the separation of n-paraffins from a feed mixture employing urea, it is not intended that the inventive process should be limited thereto. The process is applicable to the separation of isoparaffin from feed mixtures wherein thiourea is employed as the adduct-forming compound. The process is particularly applicable to the lowering of jet-fuel freeze points and to the octane improvement of gasoline boiling range hydrocarbons by the removal of at least a portion of the n-paraffins contained therein.

The following example is presented as illustrative of the inventive process. It is not intended that the invention should be limited thereto.

*Example*

Kerosene having a freeze point of −31° F. and having the following distillation range:

| | Degrees F. |
|---|---|
| Initial | 338 |
| 10% | 390 |
| 50% | 438 |
| 90% | 496 |
| EP | 520 | is passed via conduit means 10 to contact vessel 11 at the rate of 42 barrels per hour. A saturated aqueous urea solution is passed to conduit 10 via conduit means 28 at a temperature of 90° F. and at a rate of 56 barrels per hour. The saturated urea solution and the kerosene feed streams are mixed in contact vessel 11 and the formed emulsion passed to reactor 13 via conduit means 12.

Reactor 13 is a 35-foot by 6-foot diameter vessel containing bauxite having a void space of 40 percent. Cooling means 14 provide a means of progressively lowering the temperature of the feed stream to 75° F. Residence time within reactor 13 is 45 minutes. Adduct is formed throughout the granular bed and deposited in the void spaces.

A mixture of raffinate and aqueous urea, free of complex, is passed from reactor 13 to separator 17 via conduit means 16. Within separator 17 the two phases are separated. Raffinate product comprising 91 volume percent of the feed kerosene is withdrawn from separator 17 via conduit means 18 at the rate of 38 barrels per hour. Freeze point of the raffinate product stream is −49° F.

An aqueous urea phase is withdrawn from separator 17 via conduit means 19 and heated via heat exchange means 25 to a temperature of 140° F. The heated aqueous urea solution is then passed via conduit means 20 and conduit means 33 to reactor 29, said reactor 29 containing a complex from a previous cycle. The hot aqueous urea decomposes the complex, freeing the n-paraffin and dissolving the urea.

The mixture of n-paraffin and aqueous urea is withdrawn from reactor 29 via conduit means 34 and passed to separator 22. N-paraffin is withdrawn from separator 22 via conduit means 23 at the rate of 4 barrels per hour.

The aqueous urea solution is withdrawn from separator 22, cooled to a temperature of 90–92° F. via heat exchange means 26 and recycled via conduit means 27, conduit means 28 and conduit means 10 to contact vessel 11. A portion of the aqueous urea solution withdrawn from separator 22 and cooled via heat exchange means 26 is recycled via conduit means 27, conduit means 20 and conduit means 33 to reactor 29, thereby cooling reactor 29.

As will be evident to those skilled in the art, various modifications of this invention can be made, or followed, in the light of the foregoing disclosure and discussion without departing from the spirit or the scope thereof.

I claim:

1. A process which comprises admixing an aqueous urea solution with a liquid feed containing a straight chain hydrocarbon having at least 7 carbon atoms per molecule in a contact zone, passing a liquid mixture comprising said liquid feed and said aqueous urea solution from said contact zone to an elongated reaction zone, said reaction zone containing a fixed granular bed, progressively cooling said liquid mixture as said liquid mixture passes through said fixed granular bed, maintaining a temperature gradient through said granular bed, the temperature decreasing from the inlet to the outlet of said bed, thereby forming a urea adduct within said fixed granular bed and distributing the formed adduct throughout said granular bed, and withdrawing from said reaction zone a liquid mixture having a reduced straight chain hydrocarbon concentration.

2. A process which comprises admixing a thiourea aqueous solution with a liquid feed containing a branched chain hydrocarbon having at least 7 carbon atoms per molecule in a contact zone, passing a liquid mixture comprising said liquid feed and said thiourea aqueous solution from said contact zone to an elongated reaction zone, said reaction zone containing a fixed granular bed, progressively cooling said liquid mixture as said liquid mixture passes through said fixed granular bed, maintaining a temperature gradient through said granular bed, the temperature decreasing from the inlet to the outlet of said bed, thereby forming a thiourea adduct within said fixed granular bed, and distributing the formed adduct throughout said granular bed and withdrawing from said reaction zone a liquid mixture having a reduced branched chain hydrocarbon concentration.

3. The process of claim 2 wherein the granular material contained in said fixed granular bed will have a particle size ranging from 4 to 20 mesh.

4. A process which comprises admixing a saturated aqueous urea solution with a liquid feed containing a straight chain hydrocarbon having at least 7 carbon atoms per molecule in a contact zone, passing a liquid mixture comprising said liquid feed and said saturated aqueous urea solution from said contact zone to an elongated reaction zone, said reaction zone containing a fixed granular bed, progressively cooling said liquid mixture as said liquid mixture passes through said fixed granular bed, maintaining a temperature gradient through said granular bed, the temperature decreasing from the inlet to the outlet of said bed, thereby forming a urea adduct within said fixed granular bed and distributing the formed adduct throughout said granular bed, withdrawing from said reaction zone a liquid mixture having a reduced straight chain hydrocarbon concentration thereafter, passing an aqueous urea solution at an elevated temperature through said fixed granular bed, thereby decomposing the urea adduct within said fixed granular bed, and withdrawing a liquid mixture containing normal paraffins from said decomposed urea adduct from said reaction zone.

5. A process which comprises admixing a saturated aqueous urea solution with a hydrocarbon feed containing a straight chain hydrocarbon having at least 7 carbon atoms per molecule in a contact zone, passing a liquid mixture comprising said hydrocarbon feed and said saturated aqueous urea solution from said contact zone to an elongated reaction zone, said reaction zone containing a fixed granular bed, progressively cooling said liquid mixture as said liquid mixture passes through said fixed granular bed, maintaining a temperature gradient through said granular bed, the temperature decreasing from the inlet to the outlet of said bed, thereby forming a urea adduct within said fixed granular bed and distributing the formed adduct throughout said granular bed, passing a liquid mixture having a reduced straight chain hydrocarbon concentration from said reaction zone to a separation zone, withdrawing a hydrocarbon phase from said separation zone, and withdrawing an aqueous urea phase from said separation zone.

6. The process of claim 5 to include passing an aqueous urea solution at an elevated temperature through said fixed granular bed containing said urea adduct, thereby decomposing said urea adduct, and withdrawing from said reaction zone a liquid mixture containing normal paraffins from said decomposed urea adduct.

7. The process of claim 6 to include passing said liquid mixture containing normal paraffins from said decomposed urea adduct to a separation zone, withdrawing a hydrocarbon phase from said second separation zone, and withdrawing an aqueous urea phase from said second separation zone.

8. A process which comprises admixing a saturated aqueous urea solution with a hydrocarbon feed containing a straight chain hydrocarbon having at least 7 carbon atoms per molecule in a contact zone, passing a liquid mixture comprising said hydrocarbon feed and said saturated aqueous urea solution from said contact zone to an elongated first reaction zone, said first reaction zone containing a fixed granular bed, progressively cooling said liquid mixture as said liquid mixture passes through said fixed granular bed, maintaining a temperature gradient through said granular bed, the temperature decreasing from the inlet to the outlet of said bed, thereby forming a urea adduct within said fixed granular bed and distributing the formed adduct throughout said granular bed, passing a liquid mixture having a reduced straight chain hydrocarbon concentration from said first reaction zone to a first separation zone, withdrawing from said first separation zone a hydrocarbon phase, withdrawing from said first separation zone an aqueous urea phase, passing an aqueous urea phase at an elevated temperature to said fixed granular bed containing said urea adduct, thereby decomposing said urea adduct, passing a liquid mixture containing normal paraffins from said decomposed urea adduct from said first reaction zone to a second separation zone, withdrawing a hydrocarbon phase from said second separation zone, withdrawing an aqueous urea phase from said second separation zone, passing a liquid mixture comprising said hydrocarbon feed and said saturated aqueous urea solution from said contact zone to an elongated second reaction zone while said urea adduct is being decomposed in said first reaction zone, said second reaction zone containing a fixed granular bed, progressively cooling said liquid mixture as said liquid mixture passes through said fixed granular bed within said second reaction zone, maintaining a temperature gradient through said second reaction zone granular bed, the temperature decreasing from the inlet to the outlet of said second reaction zone bed, thereby forming a urea adduct within said second reaction zone fixed granular bed and distributing the formed adduct throughout said granular bed, passing a liquid mixture from said second reaction zone to said first separation zone, passing an aqueous urea solution to said second reaction zone at an elevated temperature, thereby decomposing the urea adduct formed within said second reaction zone, passing a liquid mixture containing normal paraffins from said decomposed urea adduct from said second reaction zone to said second separation zone, and passing a liquid mixture comprising said hydrocarbon feed and said saturated aqueous urea solution from said contact zone to said first reaction zone during the decomposition of the urea adduct formed within said second reaction zone.

References Cited by the Examiner
UNITED STATES PATENTS

| | | | |
|---|---|---|---|
| 2,557,257 | 6/1951 | Melrose | 260—96.5 |
| 2,577,202 | 12/1951 | Lieu et al. | 260—96.5 |
| 2,676,141 | 4/1954 | Kane et al. | 260—96.5 |
| 2,716,113 | 8/1955 | Axe | 260—96.5 |
| 2,809,961 | 10/1957 | Callahan | 260—96.5 |
| 2,879,220 | 3/1959 | Arnold et al. | 260—96.5 |
| 2,890,161 | 6/1959 | Brown et al. | 260—96.5 |

NICHOLAS S. RIZZO, *Primary Examiner.*